US010240646B2

(12) United States Patent
Dole et al.

(10) Patent No.: US 10,240,646 B2
(45) Date of Patent: Mar. 26, 2019

(54) HYDRAULIC CONTROL SYSTEM FOR DUAL WET CLUTCH

(71) Applicant: VALEO EMBRAYAGES, Amiens (FR)

(72) Inventors: Arnaud Dole, Marcelcave (FR); Francois Thibaut, Longueau (FR)

(73) Assignee: Valeo Embrayages, Amiens (FR)

( * ) Notice: Subject to any disclaimer, the term of this patent is extended or adjusted under 35 U.S.C. 154(b) by 86 days.

(21) Appl. No.: 15/457,644

(22) Filed: Mar. 13, 2017

(65) Prior Publication Data
US 2017/0268580 A1   Sep. 21, 2017

(30) Foreign Application Priority Data

Mar. 16, 2016   (FR) ..................... 16 52224

(51) Int. Cl.
| F16D 13/72 | (2006.01) |
| F16D 25/10 | (2006.01) |
| F16D 21/06 | (2006.01) |
| F16D 13/52 | (2006.01) |
| F16D 25/0638 | (2006.01) |
| F16D 25/12 | (2006.01) |

(52) U.S. Cl.
CPC ............ *F16D 13/72* (2013.01); *F16D 13/52* (2013.01); *F16D 21/06* (2013.01); *F16D 25/0638* (2013.01); *F16D 25/10* (2013.01); *F16D 25/123* (2013.01); *F16D 2021/0661* (2013.01); *F16D 2300/0214* (2013.01)

(58) Field of Classification Search
CPC ........ F16D 13/72; F16D 25/123; F16D 13/52; F16D 25/0638; F16D 21/06; F16D 25/10; F16D 2300/0214; F16D 2021/0661
See application file for complete search history.

(56) References Cited

U.S. PATENT DOCUMENTS

| 7,392,890 B2 * | 7/2008 | Agner ..................... F16D 21/06 192/110 B |
| 8,636,125 B2 * | 1/2014 | Diemer ................... F16D 21/06 192/30 W |
| 2015/0219167 A1 | 8/2015 | Kramm et al. | |

FOREIGN PATENT DOCUMENTS

| DE | 102014209618 A1 | 12/2014 |
| DE | 102014212805 A1 | 1/2015 |
| EP | 2161466 A2 | 3/2010 |

(Continued)

*Primary Examiner* — Ramya P Burgess
*Assistant Examiner* — Lillian T Nguyen
(74) *Attorney, Agent, or Firm* — Berenato & White, LLC

(57) ABSTRACT

A hydraulic control system (21) for a dual wet clutch (1) has two clutches (4, 5). The hydraulic control system (21) includes a housing (41) having an internal tube (42) extending axially around the axis X and configuring an internal space intended for passage of the two input shafts (2, 3) of a gearbox, and first and second annular chambers (43, 44) concentric around the axis X and disposed radially around the internal tube (42). The hydraulic control system (21) further includes first and second annular pistons (45, 46), which are respectively mounted axially slidingly inside the first and second annular chambers (43, 44). Each of the first and second annular pistons (45, 46) carrying a rotating stop (49, 50). The internal tube (42) has at least one flow conduit (55) for a cooling fluid, intended to direct the cooling fluid to the clutches (4, 5).

20 Claims, 3 Drawing Sheets

(56) References Cited

FOREIGN PATENT DOCUMENTS

FR 2867820 A1 9/2005
WO WO-2011063788 A2 * 6/2011 ............. F16D 21/06

* cited by examiner

HYDRAULIC CONTROL SYSTEM FOR DUAL WET CLUTCH

CROSS-REFERENCE TO RELATED APPLICATIONS AND CLAIM TO PRIORITY

This application is related to Patent Application No. 1652224 filed Mar. 16, 2016 in France, the disclosure of which is incorporated herein by reference and to which priority is claimed.

FIELD OF THE INVENTION

The invention relates to the field of motor vehicle transmissions.

The invention relates more specifically to a dual wet clutch intended to be disposed in a transmission drivetrain of a motor vehicle between an engine unit and a gearbox comprising two input shafts.

BACKGROUND OF THE INVENTION

A dual wet clutch has an input hub intended to be rotationally integrated with an engine flywheel fastened to the crankshaft of the engine, and two clutches each having an input disc carrier rotationally connected to the input hub, an output disc carrier rotationally connected to one or the other of the two input shafts of a gearbox, and a multiple-disc assemblage that is intended to transmit a torque between the input disc carrier and the output disc carrier of said clutch when said clutch is in its engaged position.

One of the input shafts of the gearbox, rotationally connected to the output disc carrier of the one of the clutches, corresponds to the odd-numbered ratios of the gearbox, while the other input shaft, rotationally connected to the output disc carrier of the other clutch, corresponds to the even-numbered ratios. In order to perform a change of ratio, one of the clutches is therefore displaced from its engaged position to its disengaged position, while the other clutch is displaced from its disengaged position to its engaged position. A dual clutch of this kind thus allows a change of ratio with no interruption in torque.

The existing art, and in particular the document US 2015 0219167, discloses a dual wet clutch of this kind in which the input disc carriers are supported by a hub that is mounted rotatably on a control shaft fastened on the housing of the gearbox. Each of these clutches is controlled by a respective piston that is mounted on the hub, axially movably between a disengaged position and an engaged position in which it presses the discs of the multiple-disc assemblage of said clutch against one another in order to transmit a torque between the respective input and output disc carriers. Each of the pistons is disposed between an activation chamber, which when it is pressurized allows the piston to be displaced from its disengaged position to its engaged position, and a balancing chamber that allows compensation for the dynamic pressure induced by centrifugal force. The control shaft has a plurality of oil supply conduits that are each connected to one or more respective holes configured in the hub, said holes each opening into one of the activation or balancing chambers. Dynamic seals are disposed between the control shaft and the hub, and allow the conduits of the control shaft to be separated in sealed fashion. In addition, the compensation chambers permit fluid to circulate to the multiple-disc assemblages so as to ensure lubrication and cooling of said multiple-disc assemblages.

A dual clutch of this kind is not entirely satisfactory, since the presence of dynamic seals has the effect of generating friction that induces a drag torque which is responsible for excessive energy consumption.

Also known, in particular from DE 10 2014 212805, are dual wet clutches that are actuated by means of a hydraulic control system having a housing intended to be fastened on the gearbox, having two concentric annular chambers and two annular pistons axially movable respectively in one and the other of the two annular chambers. Each of the pistons carries a rotating stop that is in abutment against a force transmission member interacting with one or the other of the two clutches so as to displace said clutch between a disengaged position and an engaged position upon movement of the piston within its respective annular chamber. A control system of this kind allows the drag torque to be limited, and consequently offers satisfactory energy consumption performance.

The fluid intended for cooling of the clutches is supplied, however, through one of the input shafts of the gearbox, which makes production of the gearbox more complex.

SUMMARY OF THE INVENTION

An idea on which the invention is based is to eliminate the disadvantages of the existing art by proposing a dual wet clutch that offers low energy consumption and ensures cooling of the clutches in simple fashion.

According to an embodiment, the invention furnishes a hydraulic control system for a dual wet clutch that has two clutches and is intended to be disposed in a motor vehicle transmission drivetrain between an engine having a crankshaft and a gearbox comprising two input shafts extending along an axis X, the hydraulic control system having:
   a housing intended to be fastened onto the gearbox, said housing having an internal tube extending axially around the axis X and configuring an internal space intended for passage of the two coaxial input shafts of the gearbox, said housing furthermore having a first and a second annular chamber concentric around the axis X and disposed radially around the internal tube, the first annular chamber being arranged radially outside the second annular chamber;
   a first and a second annular piston, which are respectively mounted inside the first and the second annular chamber axially slidingly between an inactive position and an active position, the first and the second annular piston each carrying a rotating stop intended to interact respectively with a first and a second force transmission member, the first and second force transmission members interacting respectively with one and the other of the two clutches of the dual clutch in order to displace said clutch between a disengaged position and an engaged position, the inactive position and the active position of the first and the second annular piston corresponding respectively to a disengaged position and an engaged position of the respective clutch;
   the internal tube extending axially toward the two clutches beyond the first and second annular chambers and having at least one flow conduit for a cooling fluid, intended to direct said cooling fluid to the clutches;
   said flow conduit for a cooling fluid having an output orifice opening axially beyond the rotating stop of the second annular piston regardless of the position of said second annular piston between its inactive position and its active position.

A hydraulic control system of this kind therefore does not require the presence of dynamic seals, which allows the drag torque, and consequently the energy consumption of the engine, to be limited.

The cooling circuit for the clutches is moreover integrated into the hydraulic control system of the dual clutch, so that the number of components of the dual wet clutch can be reduced and its size can be decreased; this also contributes to an increase in standardization of its components.

Lastly, circulation of the cooling fluid is particularly efficient because of the appropriate axial positioning of the output orifice, which allows effective cooling of the dual clutch to be provided. In particular, because the cooling fluid flow conduit opens beyond the travel of the annular pistons between their active position and inactive position, efficient cooling of the clutches is ensured regardless of the position of the clutches and, in particular, when they are positioned at the biting point and the cooling requirements are therefore greatest.

According to other advantageous embodiments, a hydraulic control system of this kind can exhibit one or several of the following characteristics:

According to an embodiment, the output orifice is oriented radially.

According to an embodiment, the internal tube has a plurality of cooling fluid flow conduits distributed circumferentially around the axis X, which allows efficient and homogeneous cooling to be ensured. According to an embodiment, the cooling fluid flow conduits are evenly distributed around the axis X.

According to an embodiment, the internal tube is materially integral, i.e. made as a single piece, with the housing.

According to an embodiment, the invention furnishes a dual wet clutch intended to be disposed in a motor vehicle transmission drivetrain between an engine having a crankshaft and a gearbox comprising two input shafts extending along an axis X, said dual wet clutch having two clutches that are respectively capable of transmitting a torque from the crankshaft to one and the other of the two input shafts of the gearbox, each clutch having:
- an input disc carrier intended to be rotationally coupled to the crankshaft;
- an output disc carrier intended to be rotationally coupled to one or the other of the two input shafts of the gearbox;
- a multiple-disc assemblage having at least one friction disc rotationally integral with one of the input and output disc carriers and at least two plates disposed respectively on either side of each friction disc, rotationally integral with the other of the input and output disc carriers and axially movable between a disengaged position and an engaged position in which said plates grip said friction disc so as to transmit a torque between the input disc carrier and the output disc carrier; and
- a movable force transmission member that is capable of displacing the multiple-disc assemblage from its disengaged position to its engaged position, said dual wet clutch furthermore having an aforementioned hydraulic control system, the two rotating stops carried respectively by the first and second annular pistons interacting respectively with the force transmission member of the one and the other of the two clutches.

According to other advantageous embodiments, a dual wet clutch of this kind can exhibit one or more of the following characteristics:

According to an embodiment, the two clutches are disposed radially one inside the other, which allows the axial size of the dual clutch to be limited.

According to an embodiment, the cooling fluid flow conduit has an output orifice opening radially inside the two clutches.

According to an embodiment, the cooling fluid flow conduit has an output orifice opening axially between the input disc carrier and the force transmission member.

According to another embodiment, the cooling fluid flow conduit has an output orifice opening axially between the input disc carrier and one of the output disc carriers.

According to another embodiment, the cooling fluid flow conduit has an orifice opening in a plane perpendicular to the axis X, said plane intersecting one of the cylindrical skirts of the output disc carriers.

According to an embodiment, the input disc carrier and the output disc carrier of each of the clutches have radial orifices distributed circumferentially around the axis X and intended to allow circulation of the cooling fluid radially outward through the multiple-disc assemblage of each of the clutches, from the output orifice of the cooling fluid flow conduit.

According to an embodiment, the input disc carriers of the two clutches are fastened to one another and are mounted rotatingly around the axis X on the internal tube of the hydraulic control system thanks to a bearing. Because the input disc carriers are supported on the control system, which is intended to be fastened onto the gearbox, the bearing is therefore mounted on a stable and rigid element that is not subject to axial and/or radial deflections, which ensures that the dual clutch is stable and the bearing is more reliable. In addition, since the bearing is mounted on an internal tube having a relatively small diameter, the diameter of the bearing is limited; this allows its cost to be reduced, in particular if it is a rolling bearing.

According to an embodiment, the bearing is a rolling bearing. The rolling bearing has an inner ring that is mounted around the internal tube, an outer ring mounted inside a receptacle of the input disc carrier of one of the clutches, and rolling bodies interposed between the inner ring and the outer ring. According to a variant, the inner ring is immobilized on the internal tube, in a direction opposite from the control system, by a snap ring that is mounted in a groove configured on the internal tube.

According to an embodiment, the rolling bearing is of the oblique contact type. Advantageously, the axial loads exerted by the annular pistons are absorbed by way of oblique contacts between the rolling bearing and the snap ring, which opens up a radial flow passage for the cooling fluid between the input disc carrier and one the output disc carriers.

Advantageously, the bearing is mounted on a seating surface of the internal tube, said seating surface being positioned, in the direction of the two clutches, beyond the travels of the first and second annular pistons between their inactive position and their active position when the friction seals of the multiple-disc assemblages are not worn.

According to an embodiment, the dual clutch has an input hub comprising splines intended to interact with complementary splines of an element fastened to the crankshaft of the combustion engine, such as an engine flywheel. The input disc carriers are fastened to the input hub.

According to an embodiment, the input disc carriers are disposed radially outside the output disc carrier of their respective clutch.

According to an embodiment, each input or output disc carrier has a cylindrical skirt, each friction disc or plate being mounted axially movably on the cylindrical skirt of one of the output or input disc carriers and rotationally integrally with the latter; and one of the input disc carriers has a support region directed radially inward from an edge of its cylindrical skirt toward the hydraulic control system, said support region having a radially inner edge interacting with the bearing.

According to an embodiment, the output disc carriers are fastened to an output hub or made as a single piece therewith, said output hub having splines interacting with complementary splines configured at the end of one or the other of the input shafts of the gearbox.

According to an embodiment, the cylindrical skirts of the output disc carriers are connected to their respective output hub by way of a radial region that extends radially inward from an edge of said cylindrical skirt directed in a direction opposite from the hydraulic control system.

According to an embodiment, the multiple-disc assemblage of one of the clutches is disposed radially inside the multiple-disc assemblage of the other clutch, the bearing that supports the input disc carriers being disposed radially inside the multiple-disc assemblages of the clutches, and the support region having an internal zone that is bent over in a direction opposite from the hydraulic control system, inside the multiple-disc assemblages.

According to an embodiment, the cooling fluid flow conduit has an output orifice that is configured in a region of the internal tube which is disposed axially between the bearing that supports the input disc carriers of the two clutches and the two annular chambers of the hydraulic control system, the internal zone of the support region having orifices distributed circumferentially around the axis X and intended to allow circulation of the cooling fluid.

According to an embodiment, the cooling fluid flow conduit has an output orifice that is configured in a region of the internal tube extending axially beyond the bearing that supports the input disc carriers of the two clutches.

According to an embodiment, the invention also furnishes a motor vehicle having a dual clutch of the kind recited above.

BRIEF DESCRIPTION OF THE DRAWINGS

The invention will be better understood, and other objectives, details, characteristics, and advantages thereof will emerge more clearly, in the course of the description below of several specific embodiments of the invention, furnished solely in order to illustrate and not to limit, referring to the attached drawings.

DETAILED DESCRIPTION OF THE PREFERRED EMBODIMENT(S)

In the description and the claims, the terms "outer" and "inner," as well as the orientations "axial" and "radial," will be used to designate elements of the dual clutch in accordance with the definitions given in the description. By convention, the "radial" orientation is directed orthogonally to rotation axis X of the dual clutch which determines the "axial" orientation; and, moving away from said axis from inside to outside, the "circumferential" orientation is directed orthogonally to axis X and orthogonally to the radial direction. The terms "outer" and "inner" are used to define the relative position of one element with respect to another with reference to axis X; an element close to axis X is thus referred to as "inner" as opposed to an "outer" element arranged radially at the periphery. In addition, the terms "rear" (RR) and "front" (FR) are used to define the relative position of one element with respect to another along the axial direction; an element intended to be placed close to the combustion engine is designated as "front," and an element intended to be placed close to the gearbox is designated as "rear."

Figure 1:
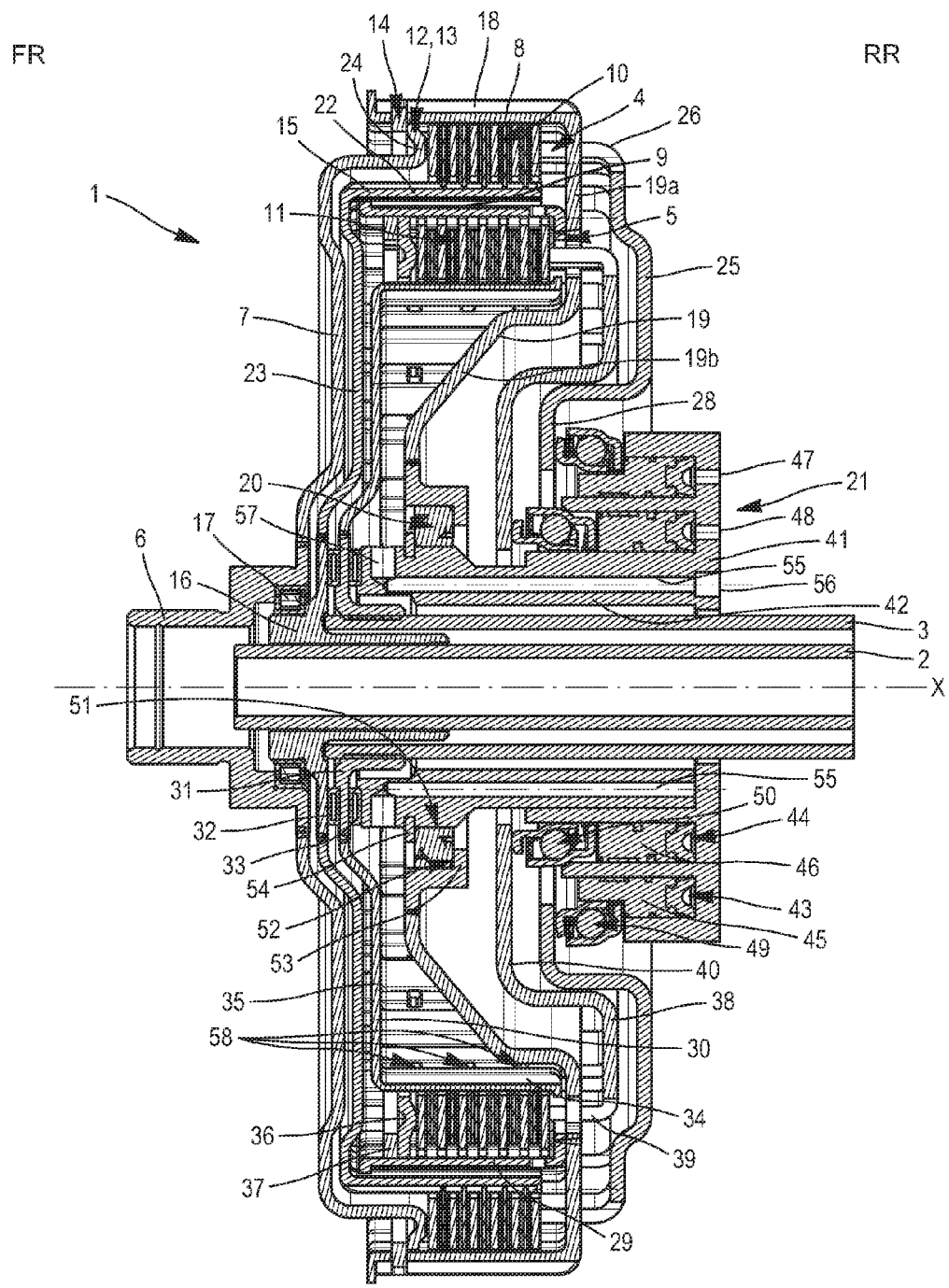
FIG. 1 is a partial section view of a dual wet clutch according to a first embodiment.

Referring to FIG. 1, a dual clutch 1 is depicted, intended to be disposed between an engine block and a gearbox. The purpose of a dual clutch 1 of this kind is to transmit a torque from the crankshaft of the combustion engine selectively to one or the other of the two coaxial input shafts 2, 3 of the gearbox. Shaft 2 (the inner one) passes through the housing of the gearbox and extends longitudinally along axis X. Shaft 3 (which is hollow) also passes through the housing of the gearbox and surrounds inner shaft 2. Dual clutch 1 has two clutches 4, 5 that are each intended to temporarily couple the crankshaft of the combustion engine to one of input shafts 2, 3 of the gearbox. One of input shafts 2, 3 of the gearbox corresponds to certain ratios of the gearbox, for example the odd-numbered gear ratios and reverse gear, and the other corresponds to the other gear ratios, for example the even-numbered gear ratios. In order to bring about a change in gear ratio, one of clutches 4, 5 is therefore displaced from its engaged position to its disengaged position while the other clutch 4, 5 is displaced from its disengaged position to its engaged position, so that engine torque is transferred progressively from one of clutches 4, 5 to the other. A dual clutch 1 of this kind thus allows gear ratio changing with no interruption in torque, i.e. while maintaining the transmission of engine torque to the vehicle's wheels.

Dual clutch 1 comprises an input hub 6 that has outer splines intended to interact with complementary splines constituted on an element fastened to the crankshaft of the combustion engine, such as a single or dual engine flywheel (not illustrated).

Dual clutch 1 is intended to be received in a clutch housing (not illustrated) that is fastened onto the gearbox. The clutch housing is closed toward the front by means of a closure cap (not illustrated) that is guided rotationally on the outer cylindrical surface of input hub 6 by means of a bearing (not illustrated). The closure cap carries on its outer periphery an annular seal that interacts with the inner surface of the clutch housing in order to ensure sealing of dual clutch 1.

Dual clutch 1 also has an input web 7 that is welded to input hub 6 or is made as a single piece therewith. The input web is rotationally connected to an input disc carrier of each of the two clutches 4, 5.

The two clutches 4, 5 each have a multiple-disc assemblage 10, 11, i.e. an axial stack of friction discs and plates. Multiple-disc assemblages 10, 11 of the one and the other of the two clutches are disposed radially one inside the other in order to limit the axial size of dual clutch 1.

First clutch 4, i.e. the clutch whose multiple-disc assemblage 10 is radially outside that of the other clutch 5, has an input disc carrier 8 that is fastened on input web 7. For this, input web 7 has on its outer periphery an outer tooth set 12 that interacts with an inner tooth set 13 constituted on the inner surface of input disc carrier 8 of first clutch 4 in order to rotationally integrate input web 7 with said input disc carrier 8. In addition, input web 7 is immobilized axially toward the rear, with respect to input disc carrier 8 of first clutch 4, by means of a retaining ring 14. Retaining ring 14 is, for example, an elastic coupling clip that is received in a groove configured at the front end of input disc carrier 8 of first clutch 4.

First clutch 4 also has an output disc carrier 15 that is fastened to an output hub 16 or is made as a single piece therewith. Output hub 16 is splined, and interacts with complementary splines configured on the outer periphery of the end of one of the input shafts of the gearbox, in this case inner shaft 2. Output hub 16 of output disc carrier 15 is thus rotationally integral with inner shaft 2. Output hub 16 has at the front, on its outer periphery, a shoulder defining an axial abutment surface for a bearing 17. Bearing 17 furthermore interacts with a shoulder that is configured on the inner periphery of input hub 6 and defines an axial abutment surface for said bearing 17. Axial positioning of output disc carrier 15 of first clutch 4 with respect to input web 7 can thus be ensured by way of bearing 17. Bearing 17 is, for example, a rolling bearing.

Input disc carrier 8 has an axially oriented cylindrical skirt 18 in which an inner tooth set is configured, and an annularly shaped support region 19 that extends radially inward from the rear end of cylindrical skirt 18. Support region 19 and cylindrical skirt 18 can be made as a single piece from one metal sheet, as in the embodiment depicted, or can be made from two different parts fastened to one another. Input disc carrier 8 is mounted rotatingly on hydraulic control system 21 by means of a bearing 20, described in more detail below, which interacts on the one hand with control system 21 and on the other hand with the radially inner edge of support region 19. Advantageously, in order to limit the axial size of the dual clutch, support region 19 of input disc carrier 8 has an outer zone 19a that exhibits a radial orientation and is disposed at the rear of multiple-disc assemblages 10, 11 of the two clutches 4, 5, and an inner zone 19b that is bent over toward the front and thus extends radially inside multiple-disc assemblages 10, 11.

Output disc carrier 15 has an axially oriented cylindrical sleeve 22 that is disposed radially inside cylindrical sleeve 18 of input disc carrier 8 and inside which is configured an outer tooth set. Output disc carrier 15 also has a radially oriented region 23 that extends radially from the front end of cylindrical skirt 22 of output disc carrier 15 to output hub 16.

Multiple-disc assemblage 10 has a plurality of annular plates made, for example, of steel, which are rotationally integral with input disc carrier 8 and mounted axially slidingly with respect to said input disc carrier 8. For this, each plate has on its outer periphery an outer tooth set that is meshed with the inner tooth set configured on the inner face of cylindrical skirt 18 of input disc carrier 8.

Multiple-disc assemblage 10 also has a plurality of friction discs that are each interposed between two plates and are rotationally integral with output disc carrier 15 and are free to translate axially. For this, each friction disc has on its inner periphery an inner tooth set that is meshed with the outer tooth set carried by cylindrical skirt 22 of output disc carrier 15. Each friction disc has friction linings disposed on each of its faces (front and rear).

Figure 3:
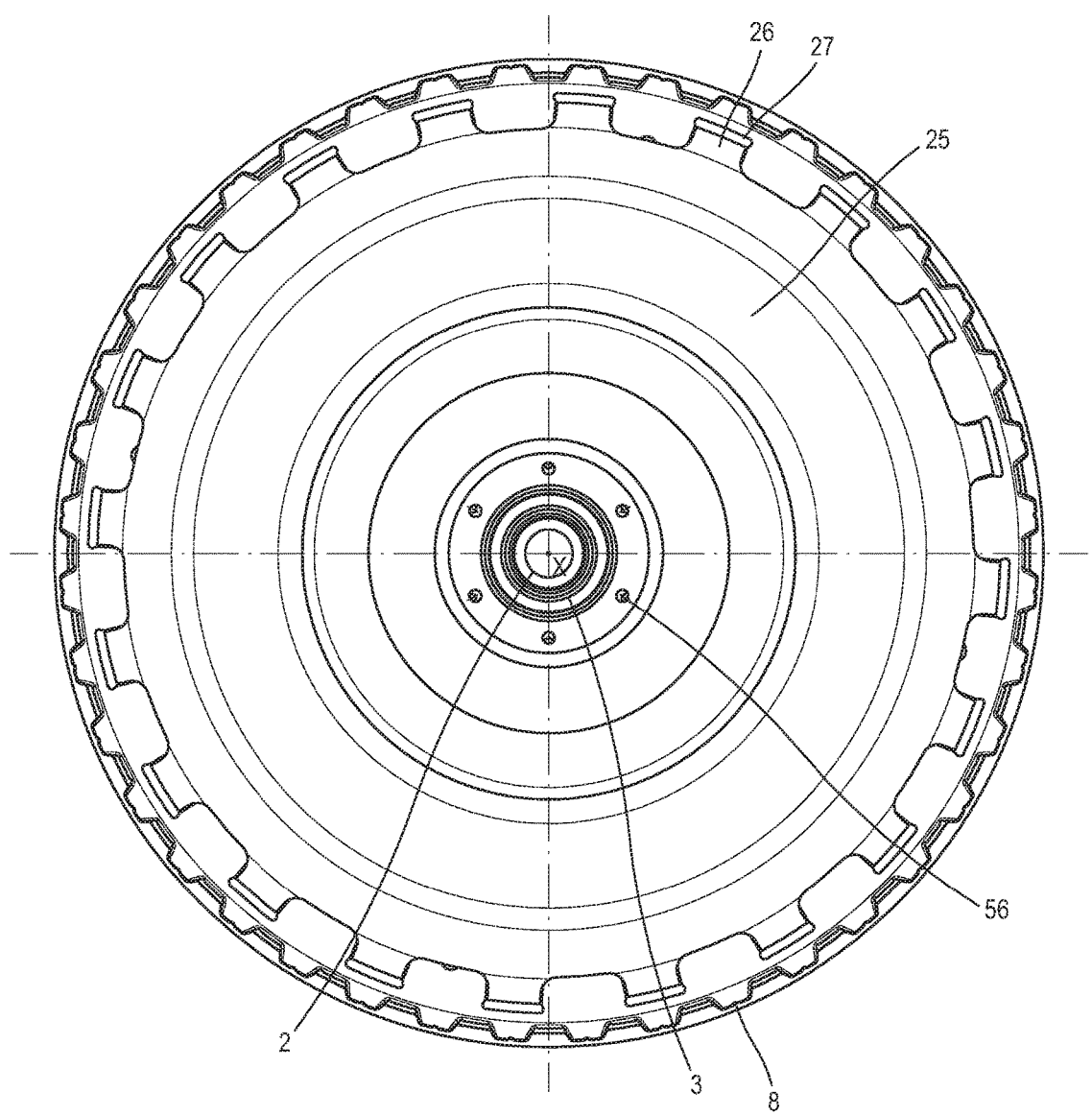
FIG. 3 is a rear view of the dual wet clutch of FIG. 1.

Multiple-disc assemblage 10 is in abutment toward the front against a reaction zone constituted on input web 7. In the embodiment that is depicted, the reaction zone is configured thanks to an annular rim 24 constituted near the outer periphery of input web 7. In addition, the plate disposed at the rear end of multiple-disc assemblage 10 interacts with a force transmission member 25. Force transmission member 25 is mounted axially slidingly and interacts with hydraulic control system 21, described in more detail below, which is capable of causing force transmission member 25 to slide axially toward the front in order to displace first clutch 4 from its disengaged position to its engaged position. Force transmission member 25 is constituted here by a metal sheet that has at its external periphery a plurality of axially oriented fingers 26 regularly distributed around axis X. As depicted in FIG. 3, each finger 26 passes through support region 19 of input disc carrier 8 thanks to a dedicated opening 27. Returning to FIG. 1, it is evident that each finger 26 is therefore in abutment against the plate disposed at the rear end of multiple-disc assemblage 10 of first clutch 4.

In order to displace first clutch 4 from its disengaged position to its engaged position, force transmission member 25 is displaced toward the front so that each of the friction discs is gripped between two plates and so that torque is thus transmitted between input disc carrier 8 and output disc carrier 15, and consequently between the crankshaft of the combustion engine and inner input shaft 2 of the gearbox.

Conversely, when force transmission member 25 is no longer loaded toward the front, the friction discs and plates return to their disengaged position in which they are axially spaced away from one another. In order to facilitate the return of the friction discs and plates to their disengaged position, corrugated spring washers (not depicted) are interposed between the plates. In each gap between two adjacent plates, a spring washer is disposed radially on the outside of the friction disc arranged in that gap.

In order to limit the axial size of dual clutch 1, force transmission member 25 has on its inner region an axial indentation 28 toward the front, inside which hydraulic control system 21 is received at least in part.

Second clutch 5, i.e. the clutch whose multiple-disc assemblage 11 is disposed radially inside that of the other clutch 4, has a structure analogous to the first clutch. Second clutch 5 has an input disc carrier 9 rotationally integral with input web 7. For this, input disc carrier 9 of second clutch 5 is fastened, for example by welding, onto support region 19 of input disk carrier 8 of first clutch 4. Input disc carrier 9 has an axially oriented cylindrical skirt 29 that is disposed radially inside cylindrical skirt 22 of output disc carrier 15 of first clutch 4. Cylindrical skirt 29 has an inner tooth set.

Second clutch 5 also has an output disc carrier 30 that is fastened to an output hub 31 or is made as a single piece therewith. Output hub 31 has inner splines that interact with complementary splines configured on the outer periphery of the end of one of the input shafts of the gearbox, in this case outer shaft 3. In order to ensure axial positioning of output disc carrier 30, a first axial bearing 32 is interposed between output hub 16 of first clutch 4 and output hub 31 of second clutch 5, and a second axial bearing 33 is interposed between output hub 31 of second clutch 5 and an internal tube 42 of hydraulic control system 21.

Output disc carrier 30 has an axially oriented cylindrical skirt 34, disposed radially inside cylindrical sleeve 29 of input disc carrier 9 and having an inner tooth set. Output disc carrier 30 also has a radially oriented region 35 that extends radially from the front end of cylindrical skirt 34 of output disc carrier 30 to output hub 31.

Multiple-disc assemblage 11 of second clutch 5 has a plurality of annular plates having a structure analogous to that of the annular plates of first clutch 4. Each plate has on its outer periphery an outer tooth set that interacts with the complementary tooth set configured on the inner face of cylindrical skirt 29 of input disc carrier 9. Multiple-disc assemblage 11 furthermore has a plurality of friction discs that have a structure analogous to those of first clutch 4 and are mounted rotationally integrally with output disc carrier 30 and axially slidingly thereon. For this, each friction disk has on its inner periphery an inner tooth set that is meshed with the outer tooth set configured on cylindrical skirt 34 of output disc carrier 30. Each friction disc is interposed between two plates.

The plate disposed at the front end of multiple-disc assemblage 11 interacts with a reaction member 36. Reaction member 36 is in turn immobilized toward the front by means of a retaining ring 37 that is fastened on input disc carrier 9 of second clutch 5 at the front end of its cylindrical skirt 34.

Second clutch 5 is actuated by means of a force transmission member 38 that on the one hand interacts with the plate disposed at the rear end of multiple-disc assemblage 11 of second clutch 5, and on the other hand interacts with hydraulic control system 21 that is capable of causing it to slide axially toward the front in order to displace second clutch 5 from its disengaged position to its engaged position. Force transmission member 38 is constituted here by a metal sheet that has at its outer periphery a plurality of axially oriented fingers 39, regularly distributed around axis X. Each finger 39 passes through a dedicated opening configured in support region 19 of input disc carrier 8 of first clutch 4, and is thus in abutment against the plate disposed at the rear end of multiple-disc assemblage 11 of second clutch 5.

In order to displace second clutch 5 from its disengaged position to its engaged position, force transmission member 38 is displaced toward the front so that each of the friction discs is gripped between two plates, and so that torque is thus transmitted between input disc carrier 9 and output disc carrier 30 and consequently between the crankshaft of the combustion engine and outer input shaft 3 of the gearbox.

In order to limit the axial size of the dual clutch, force transmission member 38 has on its inner region an axial indentation 40 toward the front, inside which hydraulic control system 21 is received at least in part.

Dual clutch 1 furthermore has a hydraulic control system 21 allowing the two clutches 4, 5 to be actuated. Hydraulic control system 21 has a housing 41 that is fastened against a wall of the gearbox (not illustrated). Housing 41 has an internal tube 42 extending axially around axis X and configuring an internal space through which input shafts 2, 3 of the gearbox pass. Internal tube 42 is materially integral with housing 41. Housing 41 furthermore has a first and a second annular concentric chamber 43, 44 disposed radially outside internal tube 42. A first and a second piston 45, 46 of annular shape are respectively mounted axially translationally movably inside first and second chambers 43, 44.

Housing 41 furthermore has, for each of first and second chambers 43, 44, a conduit 47, 48 for supplying pressurized fluid, opening inside said chamber 43, 44 in order to allow it to be supplied with fluid. Each of conduits 47, 48 is linked to a hydraulic circuit equipped with a pump. First and second chamber 43, 44 are thus intended to be supplied with fluid in order to cause displacement of the respective piston 45, 46 toward the front, from its inactive position to its active position.

Each of first and second pistons 45, 46 carries a rotating stop 49, 50 that is fastened to the end of said piston 43, 44. Each rotating stop 49, 50 has a ring that is fastened to piston 43, 44, another ring in abutment against one of force transmission members 25, 38, and rotating bodies, such as balls, interposed between the two rings.

Internal tube 42 extends axially toward the front beyond first and second chambers 43, 44. In addition, beyond the travel of first and second pistons 45, 46 corresponding to the displacement of first and second clutches 4, 5 from their disengaged position to their engaged position, internal tube 42 has a cylindrical seating surface 51 on which is mounted bearing 20 that supports input disc carriers 8, 9 of clutches 4, 5. Bearing 20 is in this case a rolling bearing having an inner ring that is mounted around cylindrical seating surface 51 of internal tube 42, an outer ring that is mounted inside a receptacle 52 configured at the radially inner edge of support region 19 of input disc carrier 8 of first clutch 4, and rolling bodies, such as balls, interposed between the outer ring and inner ring. The rolling bearing is of the oblique contact type. Receptacle 52 has, toward the rear, a shoulder 53 allowing the outer ring to be immobilized toward the rear. In addition, the inner ring is immobilized toward the front by a snap ring 54 of the "circlip" type, which is mounted in a groove configured in internal tube 42 to the front of cylindrical seating surface 51. The outside diameter of cylindrical seating surface 51 is smaller than the inner bore of force transmission member 38.

Internal tube 42 of hydraulic control system 21 has a plurality of flow conduits 55 for cooling fluid, such as gearbox oil, intended to ensure cooling and lubrication of multiple-disc assemblages 10, 11. Conduits 55 are evenly distributed around axis X.

Each conduit 55 extends axially between an input orifice 56 opening at the rear face of housing 41 of the hydraulic control system and an output orifice 57 opening at the front end of internal tube 42. Input orifices 55 are linked to a hydraulic circuit equipped with a pump. Output orifices 57 are regularly distributed around axis X, and open radially inside multiple-disc assemblages 10, 11. Output orifices 57 are directed radially outward so as to guide the cooling fluid radially outward toward multiple-disc assemblages 10, 11. In the embodiment depicted, output orifices 57 open axially at a region of the internal tube extending beyond cylindrical seating surface 51 on which bearing 20 is mounted. The cooling fluid then flows between input disc carriers 8, 9 and output disc carriers 15, 30.

In order to allow oil circulation from the output orifices to the outside of the dual clutch while flowing through multiple-disc assemblages 10, 11, cylindrical skirts 29, 34 of input and output disc carriers 9, 30 of second clutch 5 and cylindrical skirts 18, 22 of input and output disc carriers 8, 15 of first clutch 4 have radial orifices 58. Only orifices 58 of output disc carrier 30 of second clutch 5 are visible in FIG. 1.

Figure 2:
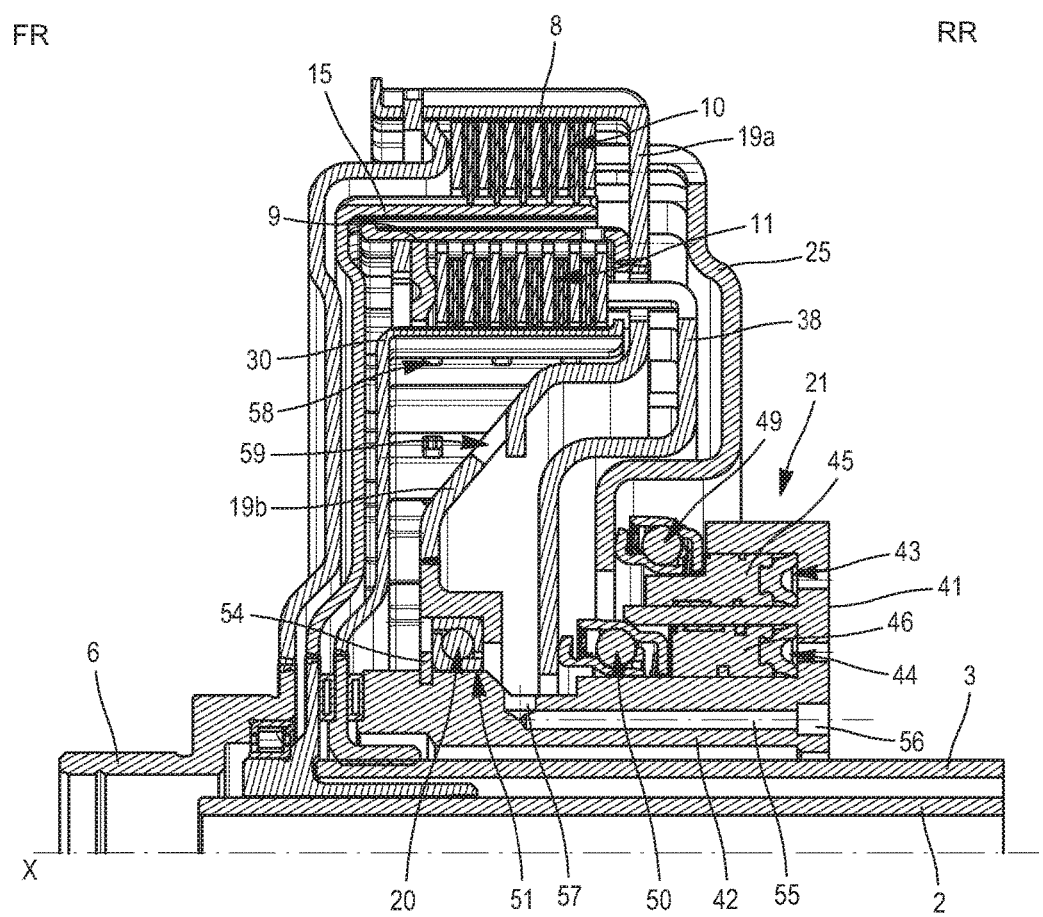
FIG. 2 is a half section view of a dual wet clutch according to another embodiment.

FIG. 2 illustrates a dual clutch 1 according to another embodiment. This embodiment differs from the preceding embodiment only in that, while output orifices 57 of conduits 55 intended to ensure circulation of the cooling fluid open radially inside multiple-disc assemblages 10, 11, they open into a region of internal tube 42 disposed axially between chambers 43, 44 of hydraulic control system 41 and cylindrical seating surface 51 that receives bearing 20. The cooling fluid then flows between input disc carriers 8, 9 and force transmission member 38. In this type of embodiment, inner zone 19a of support region 19 of input disc carrier 8 of first clutch 4 is then provided with orifices 59, regularly distributed around axis X, so as to allow circulation of the cooling fluid to multiple-disc assemblages 10, 11.

According to another embodiment that is not depicted, the output orifices of conduits 55 open along axis X, alternately on either side of cylindrical seating surface 51 that receives bearing 20.

Although the invention has been described in conjunction with several specific embodiments, it is quite apparent that it is in no way limited thereto, and that it encompasses all the technical equivalents of the means described as well as combinations thereof, if they are within the scope of the invention.

Use of the verbs "have," "comprise" or "include" and of their conjugated forms does not exclude the presence of elements or steps other than those recited in a claim.

In the claims, no reference character in parentheses shall be interpreted as a limitation of the claim.

The invention claimed is:

1. A hydraulic control system (21) for a dual wet clutch (1) having two clutches (4, 5) and intended to be disposed in a motor vehicle transmission drivetrain between an engine having a crankshaft and a gearbox comprising two coaxial input shafts (2, 3) extending along an axis (X), the hydraulic control system (21) comprising:
   a housing (41) intended to be fastened onto the gearbox, the housing (41) having an internal tube (42) extending axially around the axis (X) and configuring an internal space intended for passage of the two input shafts (2, 3) of the gearbox, the housing (41) furthermore having first and second annular chambers (43, 44) concentric around the axis (X), and disposed radially around the internal tube (42), the first annular chamber (43) being arranged radially outside the second annular chamber (44);
   first and second annular pistons (45, 46) respectively axially slidingly mounted inside the first annular chamber (43) and the second annular chamber (44), each of the first and second annular pistons (45, 46) axially moveable between an inactive position and an active position, each of the first and second annular pistons (45, 46) carrying a rotating stop (49, 50) configured to interact respectively with first and second force transmission members (25, 38), the first and second force transmission members (25, 38) interacting respectively with one and the other of the two clutches (4, 5) of the dual wet clutch (1) in order to displace one and the other of the clutches (4, 5) between a disengaged position and an engaged position of each of the two clutches (4, 5), the inactive position and the active position of the first and second annular pistons (45, 46) corresponding respectively to the disengaged position and the engaged position of the respective clutches (4, 5);
   the internal tube (42) extending axially toward the two clutches (4, 5) beyond the first and second annular chambers (43, 44) and having at least one flow conduit (55) for a cooling fluid, intended to direct the cooling fluid to the clutches (4, 5), the at least one flow conduit (55) having an output orifice (57) opening axially beyond the rotating stop (49) of the second annular piston (46) regardless of the position of the second annular piston (46) between the inactive position and the active position of the second annular piston (46).

2. The hydraulic control system according to claim 1, wherein the output orifice (57) is oriented radially.

3. The hydraulic control system according to claim 2, wherein the internal tube (42) is structurally integral with the housing (41).

4. The hydraulic control system according to claim 2, wherein the internal tube (42) has a plurality of cooling fluid flow conduits (55) distributed circumferentially around the axis (X).

5. The hydraulic control system according to claim 1, wherein the internal tube (42) is materially structurally integral with the housing (41).

6. The hydraulic control system according to claim 5, wherein the internal tube (42) has a plurality of cooling fluid flow conduits (55) distributed circumferentially around the axis (X).

7. The hydraulic control system according to claim 1, wherein the internal tube (42) has a plurality of cooling fluid flow conduits (55) distributed circumferentially around the axis (X).

8. A dual wet clutch (1) intended to be disposed in a motor vehicle transmission drivetrain between an engine having a crankshaft and a gearbox comprising two coaxial input shafts (2, 3) extending along an axis (X), the dual wet clutch (1) having two clutches (4, 5) capable of transmitting a torque from the crankshaft to one and the other of the two input shafts (2, 3) of the gearbox respectively, each of the clutches (4, 5) comprising:
   an input disc carrier (8, 9) intended to be rotationally coupled to the crankshaft;
   an output disc carrier (15, 30) intended to be rotationally coupled to one or the other of the two input shafts (2, 3) of the gearbox;
   a multiple-disc assemblage (10, 11) having at least one friction disc rotationally integral with one of the input and output disc carriers (8, 9, 15, 30) and at least two plates disposed respectively on either side of each friction disc, rotationally integral with the other of the input and output disc carriers (8, 9, 15, 30) and axially movable to grip the friction disc between the plates so as to transmit the torque between the input disc carrier (8, 9) and the output disc carrier (15, 30);
   a movable force transmission member (25, 38) capable of displacing the multiple-disc assemblage (10, 11) from the disengaged position to the engaged position of the clutch (4, 5); and
   the hydraulic control system (21) according to claim 1, wherein the two rotating stops (49, 50) carried respectively by the first and second annular pistons (45, 46) interacting respectively with the force transmission member (25, 38) of the one and the other of the two clutches (4, 5).

9. The dual wet clutch (1) according to claim 8, wherein the two clutches (4, 5) are disposed radially one inside the other.

10. The dual wet clutch (1) according to claim 9, wherein the output orifice (57) opens radially inside the two clutches (4, 5).

11. The dual wet clutch (1) according to claim 8, wherein the input disc carrier (8, 9) and the output disc carrier (15, 30) of each of the clutches (4, 5) have radial orifices (58) distributed circumferentially around the axis (X) and configured to allow circulation of the cooling fluid radially outward through the multiple-disc assemblage (10, 11) of each of the clutches (4, 5), from the at least one flow conduit (55).

12. The dual wet clutch (1) according to claim 8, wherein the input disc carriers (8, 9) of the two clutches (4, 5) are fastened to one another and are mounted rotatingly around the axis (X) on the internal tube (42) of the hydraulic control system (21) by a bearing (20).

13. The dual wet clutch (1) according to claim 12, wherein each input or output disc carrier (8, 9, 15, 30) has a cylindrical skirt (18, 22, 29, 34), wherein each friction disc or plate is mounted axially movably on the cylindrical skirt of one of the output or input disc carriers and is rotationally integral with the cylindrical skirt of one of the output or input disc carriers; wherein one of the input disc carriers (8, 9) has a support region (19) directed radially inward from an edge of the cylindrical skirt (18), and wherein the support region (19) has a shoulder (53) interacting with the bearing (20).

14. The dual wet clutch (1) according to claim 13, wherein the multiple-disc assemblage (10) of one of the clutches (4) is disposed radially inside the multiple-disc assemblage (11) of the other clutch (5); wherein the bearing (20) is disposed radially inside the multiple-disc assemblages (10, 11) of the clutches; and wherein the support region (19) has an internal zone (19*b*) bent over in a direction opposite from the hydraulic control system (21), inside the multiple-disc assemblages (10 and 11).

15. The dual wet clutch (1) according to claim 14, wherein the output orifice (57) is configured in a region of the internal tube (42) disposed axially between the bearing (20) that supports the input disc carriers (8, 9) of the two clutches (4, 5) and the two annular chambers of the hydraulic control system (21), and wherein the internal zone (19*b*) of the support region (19) has orifices (59) distributed circumferentially around the axis (X) to allow circulation of the cooling fluid.

16. The dual wet clutch (1) according to claim 13, wherein the output orifice (57) opens in a plane perpendicular to the axis (X), and wherein the plane intersects one of the cylindrical skirts (22, 34) of the output disc carriers (15, 30).

17. The dual wet clutch (1) according to claim 12, wherein the output orifice (57) is configured in a region of the internal tube (42) extending axially beyond the bearing (20) that supports the input disc carriers (8, 9) of the two clutches (4, 5).

18. A motor vehicle having the dual clutch (1) according to claim 8.

19. The dual wet clutch (1) according to claim 8, further comprising a first axial bearing (32) interposed between the output disc carrier (15) of one of the clutches (4, 5) and the output disc carrier (30) of the other of the clutches (4, 5), and a second axial bearing (33) interposed between the output disc carrier (30) of the other of the clutches (4, 5) and the internal tube 42 of hydraulic control system 21.

20. A dual wet clutch (1) intended to be disposed in a motor vehicle transmission drivetrain between an engine having a crankshaft and a gearbox comprising two coaxial input shafts (2, 3) extending along an axis (X), the dual wet clutch (1) having first and second clutches (4, 5) intended to be disposed between the engine having and the gearbox and capable of transmitting a torque from the crankshaft to one and the other of the two input shafts (2, 3) of the gearbox respectively, each of the first and second clutches (4, 5) displaceable between a disengaged position and an engaged position thereof, and comprising:

an input disc carrier (8, 9) intended to be rotationally coupled to the crankshaft;
an output disc carrier (15, 30) intended to be rotationally coupled to one or the other of the two input shafts (2, 3) of the gearbox;
a multiple-disc assemblage (10, 11) having at least one friction disc rotationally integral with one of the input and output disc carriers (8, 9, 15, 30) and at least two plates disposed respectively on either side of each friction disc, rotationally integral with the other of the input and output disc carriers (8, 9, 15, 30) and axially movable to grip the friction disc between the plates so as to transmit the torque between the input disc carrier (8, 9) and the output disc carrier (15, 30);
a movable force transmission member (25, 38) capable of displacing the multiple-disc assemblage (10, 11) from the disengaged position to the engaged position of one of the first and second clutches (4, 5);
first and second axial bearings (32, 33); and
a hydraulic control system (21) comprising:
   a housing (41) intended to be fastened onto the gearbox, the housing (41) having an internal tube (42) extending axially around the axis (X) and configuring an internal space intended for passage of the two input shafts (2, 3) of the gearbox, the housing (41) furthermore having first and second annular chambers (43, 44) concentric around the axis (X) and disposed radially around the internal tube (42), the first annular chamber (43) being arranged radially outside the second annular chamber (44);
   first and second annular pistons (45, 46) respectively axially slidingly mounted inside the first annular chamber (43) and the second annular chamber (44), each of the first and second annular pistons (45, 46) axially moveable between an inactive position and an active position, each of the first and second annular pistons (45, 46) carrying a rotating stop (49, 50) configured to interact respectively with first and second force transmission members (25, 38), the first and second force transmission members (25, 38) interacting respectively with one and the other of the two clutches (4, 5) of the dual wet clutch (1) in order to displace one and the other of the clutches (4, 5) between the disengaged position and the engaged position of each of the two clutches (4, 5), the inactive position and the active position of the first and second annular pistons (45, 46) corresponding respectively to the disengaged position and the engaged position of the respective clutches (4, 5);
   the internal tube (42) extending axially toward the two clutches (4, 5) beyond the first and second annular chambers (43, 44) and having at least one flow conduit (55) for a cooling fluid, intended to direct the cooling fluid to the clutches (4, 5), the at least one flow conduit (55) having an output orifice (57) opening axially beyond the rotating stop (49) of the second annular piston (46) regardless of the position of the second annular piston (46) between the inactive position and the active position of the second annular piston (46);
the first axial bearing (32) interposed between the output disc carrier (15) of the first clutch (4) and the output disc carrier (30) of the second clutch (5), and the second axial bearing (33) interposed between the output disc carrier (30) of the second clutch (5) and the internal tube (42) of the hydraulic control system (21).

\* \* \* \* \*